Dec. 2, 1958  P. RENAUT  2,862,384
APPARATUS FOR AUTOMATIC TESTING OF SHEETS AND LEAVES
Filed Aug. 10, 1954  2 Sheets-Sheet 2

INVENTOR.
Paul Renaut
BY
Michael S. Stryker

United States Patent Office 2,862,384
Patented Dec. 2, 1958

2,862,384

APPARATUS FOR AUTOMATIC TESTING OF SHEETS AND LEAVES

Paul Renaut, Saint-Maur, France, assignor to Realisations Ultrasoniques, a corporation of France Application August 10, 1954, Serial No. 448,956

Claims priority, application France August 20, 1953

7 Claims. (Cl. 73—67.6)

The present invention relates to apparatus for testing materials, specifically sheets or plates, metallic or not, by means of pressure waves, preferably supersonic waves.

Supersonic testing apparatus are known wherein supersonic pressure waves are transmitted through the material under investigation and wherein the amplitude of the supersonic waves is determined after a portion thereof has been absorbed in the material under test. Any defect in the material causes variations of the amplitude of the absorbed wave. Conventional apparatus of this type include a piezoelectric transmitting transducer and a receiving transducer. The material under test is interposed between the transducers. The material may be either fixed, or moving at full speed between the transducers. A difficulty arises in the conventional apparatus when it is desired to determine the exact position of the flaws in the sheet of material under test.

Complicated systems have been devised for obtaining the scanning of the surface of the sheet with a narrow supersonic beam useful for inspection purposes. These systems may use thyratrons for example and other similar apparatus which do not have a great realiability when used for industrial testing.

It is therefore an object of the present invention to provide an apparatus capable of inspecting, in a continuous manner, the quality of a sheet of material in the course of production, for instance the quality of a metal sheet being processed in a rolling-mill, and to be able to locate the flaws which may exist in the material.

Another object of the present invention is to provide apparatus for continuous inspection, by means of a supersonic beam which explores the member under test according to a general principle which has been previously applied only for testing separate points of the member.

It is still another object of the present invention to provide an apparatus which permits a continuous inspection of the sheets of material and which gives an image or a record from which the quality of the tested material may be checked and its internal flaws may be localized.

One embodiment of the present invention includes apparatus having means for moving an object to be tested along a predetermined path in a predetermined direction, elongated wave emitting means arranged on one side of the path substantially transverse and adjacent thereto for emitting a wave which impinges on one side of the object, elongated wave receiving means arranged on the other side of the path opposite and substantially parallel to the wave emitting means so as to receive waves emitted by the wave emitting means and passing through the object, and screen means movably mounted adjacent the wave emitting means and having an aperture therein arranged so that during movement of the screen means, a substantially pencil-shaped wave beam passes through the aperture thereof towards the object and the wave-receiving means and moves in a direction normal to the predetermined direction of movement of the object.

In a preferred embodiment, the received signal is displayed on the screen of a cathode-ray tube having long-persistence characteristics, and to the signal there corresponds a luminous spot sweeping the screen synchronously with the supersonic beam exploring the sheet, the luminous spot continuously appearing on the screen, except when the beam is intercepted by a flaw in the explored material, which flaw corresponds to an amplitude of the received signal inferior to a predetermined threshold under which the spot disappears on the screen. According to another embodiment, a first fixed screen mask, for instance, a part of the received beam, which is allowed to pass only through a slot parallel to the receiving piezoelectric plate, while a second cylindrical rotary screen is provided with a helical slot. Due to the cooperation of the fixed and rotary masks, there is provided a rapid transverse movement of that portion of the ultrasonic beam picked up by the receiving unit.

Such movement is obtained without the difficulties and inconveniences to which mechanical means are liable, because of inertia.

According to a modification, the movable mask is a rotary disk having a radius equal to the width of the explored sheet and provided with at least one helical slot. The rotation of this disk, in cooperation with the fixed mask, provides for a rapid transverse movement of the received supersonic beam, according to the same principle as in the embodiment herein before described.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
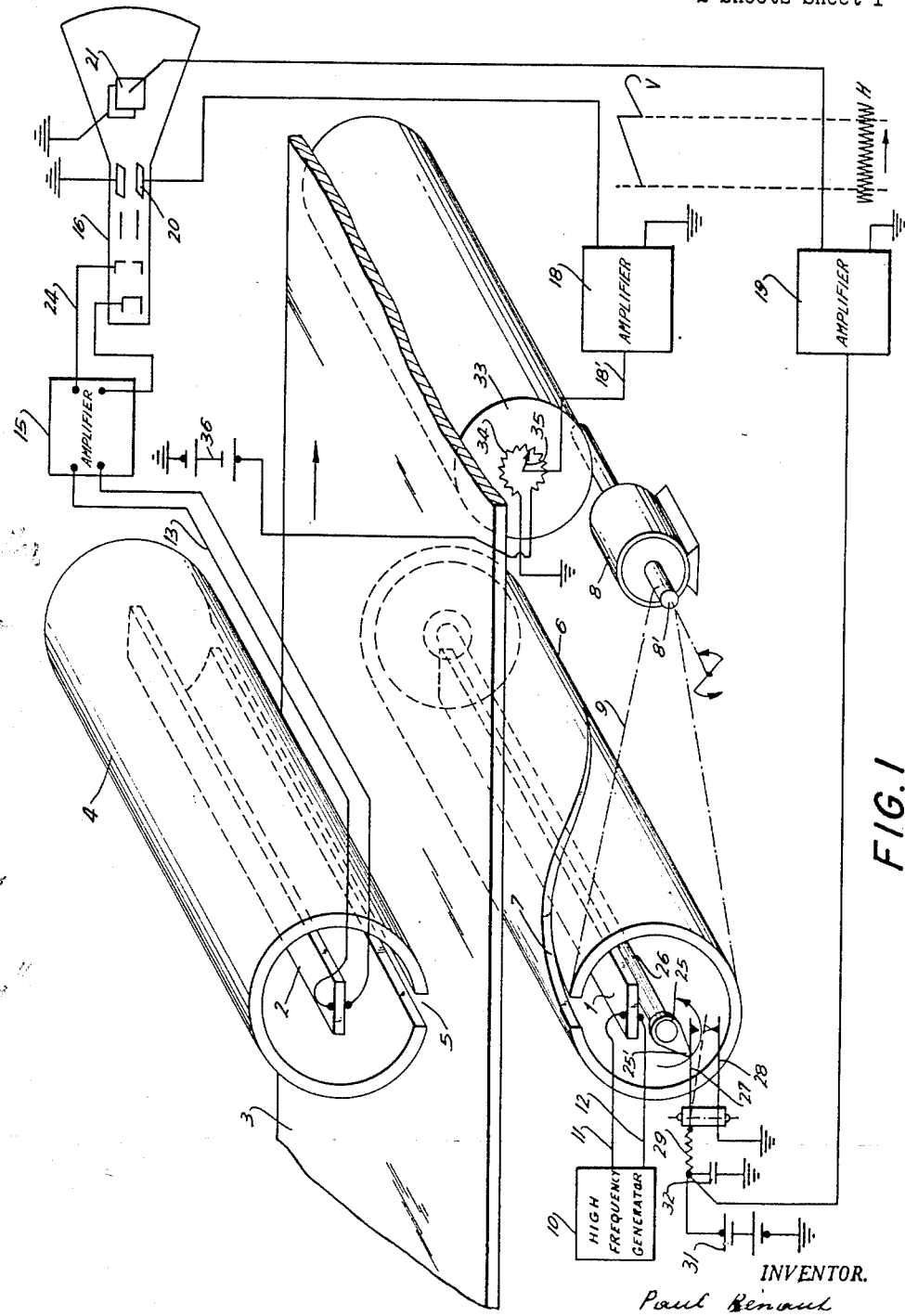
Fig. 1 is a diagrammatic view of a specific embodiment of an apparatus for continuous supersonic inspection of sheets constructed in accordance with the present invention.

Referring to the drawings and more particularly to Fig. 1, the supersonic transmitter is a piezoelectric elongated plate (or rod) 1, the plate (or rod) 2 being the receiving unit. The sheet 3 under test rolls continuously between the two piezoelectric units, which are parallel to it along its whole transverse dimension.

The receiving unit 2 is surrounded by a fixed cylindrical mask 4 made of a material through which the ultrasonic vibrations cannot be propagated, and provided with a longitudinal slot 5 opposite to the surface of the sheet 3. The transmitting unit 1 is surrounded by a rotary cylindrical mask 6, also made of a material impermeable to ultrasonic vibrations, and provided with a helical slot 7 forming one complete spiral over the length of the mask.

The rotation of the mask 6 is provided by means of a motor 8 and a funicular transmission 9. The transmitting plate 1 is excited by an alternating electric field produced by an electric potential generated in high-frequency generator 10 which is connected through the lead-in conductors 11, 12, and electrodes (not shown) lying on the unit 1. The output signal of the receiving unit is fed from electrodes lying on the unit 2 to the amplifying unit 15, and to the control electrode 24 of a cathode-ray tube 16 provided with a screen having long-persistence characteristics. For example, the persistence of the screen is such that the luminosity of the screen is divided by only a factor of 50, 5 seconds after illumination thereof by impact of the electron beam.

The motor 8 is coupled to the shaft 26 of the mask 6 by coupling means 9. The shaft, and accordingly the mask 6 is thereby rotated. One rate of revolution of the mask 6 that has been satisfactorily used is 10 revolutions per second.

On the shaft 26 is fixedly mounted a cam 25 which rotates therewith. The end 25' of the cam 25 moves a movable contact 27 against a fixed contact 28 which is grounded, once every revolution of the mask 6. The movable contact 28 is connected to a low impedance resistor 29 the other end of which is connected to one side of the capacitor 32. The other side of the capacitor 32 is grounded. The resistor 29 is also connected to the positive terminal of a source of direct current of voltage, the other terminal of which is grounded and to the input-terminal of the amplifier 19.

In operation, when the switch contacts 27 and 28 are open, the source 31 slowly charges the capacitor 32. When the contacts 27 and 28 are closed by the cam 25, the capacitor discharges through the resistor 29 to ground very quickly.

This results in a saw-tooth wave which is labeled H in Figure 1. This wave H is applied to the horizontal deflecting plates 21 of cathode-ray tube 16 after amplification in the amplifier 19. It is apparent that the contacts 27 and 28 are closed once for each complete revolution of the mask 6. This corresponds to the traversal of the width of the sheet 3 by the beam emitted from the transmitter 1.

Also shown in Figure 1 is a roller 33 which is driven by direct contact with the shaft 8' of the motor 8. The roller 33 moves the sheet 3 at a desired speed, for example 10 centimeters per second. On the rotatable shaft of the roller is mounted the movable arm 35 of the potentiometer 34, one end of which is connected to the positive terminal of the source 36 of direct current voltage, the negative terminal of the source being grounded. The other side of the potentiometer 34 is grounded. The movable arm 35 of the potentiometer 34 is electrically connected to the input of the amplifier 18 by means of a conductor 18'.

It can be seen that as the movable arm 35 makes contact with the ground end of the potentiometer 34, a zero potential is applied to the amplifier 18. As the arm 35 is rotated, the potential applied thereto will increase in a linear manner since the potentiometer 34 has a linear winding. The potential applied to the arm 35 will continue to increase linearly until the other end of the potentiometer 34 is reached at which time, the arm will have attained its maximum potential equal to the potential of the voltage source 36. The arm 35 will then move back to the grounded terminal of the potentiometer whereby its potential will again become zero and start to increase linearly as before with the rotation of the roller 33.

The saw-tooth wave thus generated has an output from the rotatable arm 35 of the potentiometer 34 is thereby synchronized with the speed of movement of the object being tested. This saw-tooth wave is shown in Figure 1 and labeled V. The wave V is applied to the vertical deflecting plates 29 of the cathode-ray tube 16.

The above described apparatus operates as follows: the moving sheet 3 is transversely scanned by the supersonic beam passing between the slots 5 and 7.

After a complete revolution of the cylindrical mask 6, the supersonic beam suddenly moves from one edge of the sheet to the opposite edge, and the scanning of a new line then begins.

The rotational speed of the cylinder 6 is calculated, as a function of the section of the beam, so that it may approximately scan the whole surface of the sheet.

For example, an embodiment has been constructed which is operated satisfactorily and which uses the following operating characteristics: The mask 6 rotated with a rotational speed of 10 revolutions per second; the scanning beam had a section 1 centimeter wide; the sheet was passed through the apparatus with a speed of 10 centimeters per second. Accordingly, the beam 1 centimeter wide scanned the sheet 10 times in one second to correspond to the speed of transmittal of 10 centimeters per second. It is appreciated that the scanning beam moves from the end of one scanning line immediately back to the beginning of the next scanning line since the spiral aperture of the mask 6 is arranged in that manner.

The rays of the supersonic beam pass freely through to the opposite side of the sheet, except where they meet flaws or portions of the sheet having characteristics which differ from that of the rest of the surface of the sheet.

Therefore, the amplitude of the electric signal applied to the control electrode of the oscilloscope is a function of the quality of the sheet. It can be seen that the period of the saw-tooth wave V is much longer than that of the saw-tooth wave H as indicated by the dotted lines in Fig. 1.

The period of the saw-tooth wave V shown in Fig. 1 at the output of the amplifier 18 is equal to the duration of the passage of a sheet in the apparatus, while the period of the saw-tooth shown at the output of the amplifier 19 is equal to the duration of a revolution of the rotary cylinder 6, and therefore, to the duration of the scanning of a "line" on the surface of the sheet. For example, in the above example the scanning of a line taking 1/10 second. Consequently, the spot moves on the screen of the cathode-ray tube synchronously with the supersonic beam scanning the sheet 3 and a complete image of the surface of the sheet is obtained on the screen, the brightness of every point of this image corresponding to the transparency to supersonic vibrations, of the corresponding point of the sheet.

To each flaw there corresponds a black spot of proportional area on the screen. The long-persistency of the image allows for an accurate localization of this black spot.

Figure 2:
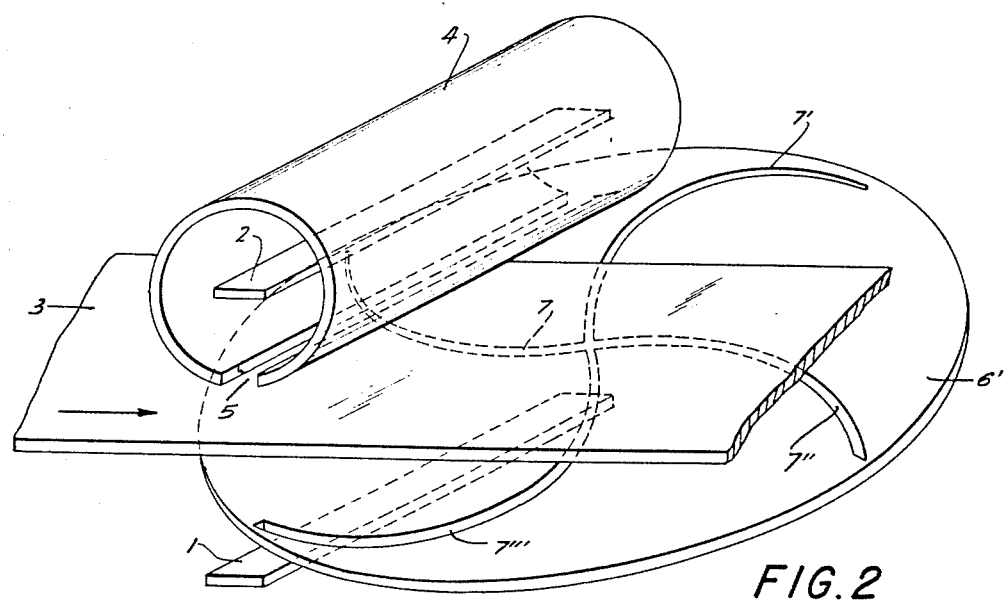
Fig. 2 is a partial view of a second embodiment.
Figure 3:
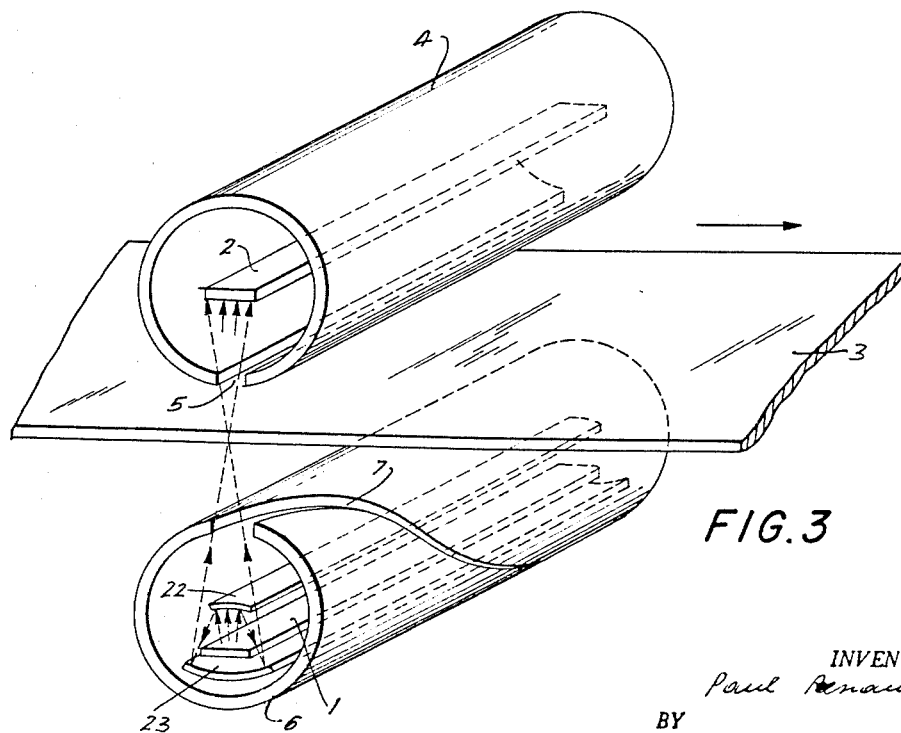
Fig. 3 is an enlarged view of a part of the apparatus of Fig. 1, in which has been incorporated a system for focusing the supersonic beam on the surface of the plate under test.

In Figs. 2 and 3, the same elements are designated by the same figures as in Fig. 1. Only a part of the complete apparatus has been shown, the rest being identical to that of Fig. 1.

In Fig. 2, for the cylinder 6 of Fig. 1 is substituted a rotary disk 6 provided with helical slots 7, 7', 7'', 7''' operating in the same manner as the helical slot 7 of Fig. 1.

The remainder of the apparatus is identical with the corresponding portions of Fig. 1. The embodiment of Fig. 2 is simpler to construct than that of Fig. 1 and provides for a given speed of rotation of the mass, a scanning velocity which is four times as high as that which can be obtained with the embodiment of Fig. 1. However, the device shown in Fig. 2 is more bulky and is preferably used for testing sheets which are no more than 50 centimeters wide.

In Fig. 3, there has been added, inside the cylinder 6, a focusing system of a known type, comprised of two metal curved sheets 22 and 23, which focus the ultrasonic rays (in dotted line) on the surface of the sheet 3. This focusing considerably improves the operation of the apparatus.

Although the preferred embodiments of the apparatus for carrying out the invention have been disclosed, it will be appreciated that modifications may be made therein by those skilled in the art. Such modifications may be made without departing from the spirit and scope of the invention, as set forth in the appended claims:

What I claim is:

1. Apparatus of the character described, comprising, in combination, means for moving an object to be tested along a predetermined path in a predetermined direction; elongated ultrasonic wave emitting means arranged on one side of said path substantially transverse and adjacent thereto; elongated wave receiving means arranged on the other side of said path opposite and substantially parallel to said wave emitting means so as to be adapted to receive waves emitted by said wave emitting means after transmission through said object; and rotatable screen means between the moving object and at least one of the emitting and receiving means and having a spiral aperture arranged so that during movement thereof a substantially pencil-shaped portion of said wave passes through said screen aperture towards said wave-receiving means and moving in a direction normal to said predetermined direction of movement of said object.

2. Apparatus of the character described comprising, in combination, means for moving an object to be tested along a predetermined path in a predetermined direction; elongated ultrasonic wave emitting means arranged on one side of said path substantially transverse and adjacent thereto; elongated ultrasonic wave receiving means arranged on the other side of said path opposite and substantially parallel to said ultrasonic wave emitting means so as to be adapted to receive ultrasonic waves emitted by said ultrasonic wave emitting means after transmission through said object; and rotatable screen means between the moving object and at least one of the emitting and receiving means and having a spiral aperture through which passes a substantially pencil-shaped portion of the ultrasonic wave beam which is transmitted from said emitting to said receiving means through said object, and which moves in a direction normal to said predetermined direction of movement of said object whereby an alternative transverse scanning motion of said portion of the beam is obtained on the surface of the object.

3. Apparatus for continuous supersonic inspection of sheets comprising, in combination, a transmitting piezoelectric elongated plate, and a receiving piezoelectric elongated plate parallel thereto; motor means for moving the test sheet at constant speed between said plates and parallel thereto; a source of alternating current potential connected to the transmitting plate whereby a beam of supersonic vibrations is transmitted through the moving sheet from the transmitting to the receiving plate; a first fixed cylindrical screen having an axis and a slot parallel to said receiving plate, said receiving plate lying along said axis and said slot being interposed between said plate and the test sheet; a second rotary cylindrical screen having an axis along which lies the transmitting plate and having a helical aperture in its surface; motor means for rotating said second screen around its axis with a constant period of rotation, the cooperation of the fixed and rotary screens providing for an alternative transverse scanning motion of the received beam on the surface of the test sheet; a cathode-ray tube having a control electrode, horizontal and vertical deflecting plates and a long persistence screen; an implifier having an input connected to said receiving plate and an output connected to the control electrode of said cathode-ray tube; means controlled by the rotation of the second screen for producing a saw-tooth wave signal having the same period as the period of rotation of said screen, said means having an output connected to said plates of horizontal deflection; and means controlled by the motion of the test sheet for generating a saw-tooth wave signal having a period equal to the duration of passage of a given portion of the sheet in the inspection device, said means having an output connected to said plates of vertical deflection whereby the line-by-line scanning of the screen of the cathode-ray tube is synchronized with the scanning of successive lines of said portion of the test sheet.

4. Apparatus for continuous supersonic inspection of sheets comprising, in combination, a transmitting piezoelectric elongated plate and a receiving piezoelectric elongated plate parallel thereto; motor means for moving the test sheet at constant speed between said plates and parallel thereto; a source of alternating current potential connected to the transmitting plate, whereby a beam of supersonic vibrations is transmitted through the moving sheet from the transmitting to the receiving plate; a first fixed cylindrical screen having an axis and a slot parallel to said receiving plate, said receiving plate lying along said axis and said slot being interposed between said plate and the test sheet; a second rotary discoidal screen interposed between the test sheet and the transmitting plate, and having a plurality of helical slots over its surface; motor means for rotating said second screen with a constant period of rotation, the cooperation of the fixed and rotary screens providing for an alternative transverse scanning motion of the received beam on the surface of the test sheet; a cathode-ray tube having a control electrode, horizontal and vertical deflection plates and a long-persistence screen; an amplifier having an input connected to said receiving plate and an output connected to the control electrode of said cathode-ray tube; means controlled by the rotation of the second screen, for producing a saw-tooth wave signal having the same period as the period of rotation of said screen, said means having an output connected to said plates of horizontal deflection; and means controlled by the motion of the test sheet for generating a saw-tooth wave signal, having a period equal to the duration of passage of a given portion of the sheet in the inspection device, said means having an output connected to said vertical deflection plates whereby the line-by-line scanning of the screen of the cathode-ray tube is synchronized with the scanning of successive lines of said portion of the test sheet.

5. Apparatus of the character described comprising, in combination, means for moving an object to be treated along a predetermined path in a predetermined direction; elongated ultrasonic wave emitting means arranged on one side of said path substantially transverse and adjacent thereto for emitting a wave which impinges on one side of said object; elongated wave receiving means arranged on the other side of said path opposite and substantially parallel to said wave emitting means so as to receive waves emitted by said wave emitting means and passing through said object; and screen means movably mounted adjacent said wave emitting means and having an aperture therein at least a portion of which is arranged between said wave emitting means and said object to be tested so that a substantially pencil-shaped wave beam passes through said portion of said aperture and impinges on said object whereby when said screen means is moved different portions of said aperture are successively arranged between said wave emitting means and said object, said different portions of said aperture lying along a line substantially parallel to the length of said wave emitting means and substantially transverse to said predetermined direction of movement of said object.

6. Apparatus of the character described comprising, in combination, means for moving an object to be tested along a predetermined path in a predetermined direction; elongated ultrasonic wave emitting means arranged on one side of said path substantially transverse and adjacent thereto for emitting an ultrasonic wave; elongated wave receiving means arranged on the other side of said path opposite and substantially parallel to said wave emitting means so as to receive waves emitted by said wave emitting means after transmission through said object; and screen means movably mounted between the moving object and at least one of said wave emitting and receiving means and having an aperture therein at least a portion of which is arranged between said respective ultrasonic wave means and said object to be tested so that a substantially pencil-shaped wave beam passes through said portion of said aperture whereby when said screen means is moved different portions of said aperture are successively arranged between said respective ultrasonic wave means and said object, said different portions of said aperture lying along a line substantially parallel to the length of said respective ultrasonic wave means and substantially transverse to said predetermined direction of movement of said object.

7. Apparatus for continuous ultrasonic inspection of sheets comprising, in combination, a transmitting piezoelectric elongated plate and a receiving piezoelectric elongated plate parallel thereto, said receiving plate producing output electrical signals upon the impingement of ultrasonic waves thereon; motor means for moving the test sheet between said plates and parallel thereto; a source of alternating current potential connected to the transmitting plate so that said plate transmits ultrasonic waves, at least a portion of which passes through the moving sheet; masking means between the moving sheet and at least one of said piezoelectric plates and having an aperture therein at least a portion of which is arranged between said respective piezoelectric plate and said object to be tested so that a substantially pencil-shaped wave beam passes through said portion of said aperture; means for moving said masking means so that different portions of said aperture are successively arranged between said respective piezoelectric plate and said object, said different portions of said aperture lying along a line substantially parallel to the length of said respective piezoelectric plate; and means connected to said receiving piezoelectric plate for indicating any output electric signal produced thereby upon impingement of an ultrasonic wave thereon.

References Cited in the file of this patent

UNITED STATES PATENTS

| | | |
|---|---|---|
| 1,979,722 | Zworykin | Nov. 6, 1934 |
| 2,164,125 | Sokoloff | June 27, 1939 |
| 2,371,963 | La Pierre | Mar. 20, 1945 |
| 2,527,208 | Berry et al. | Oct. 24, 1950 |
| 2,606,294 | Hagan | Aug. 5, 1952 |

FOREIGN PATENTS

| | | |
|---|---|---|
| 1,017,869 | France | Oct. 1, 1952 |